No. 736,702. PATENTED AUG. 18, 1903.
H. J. DAVIS & P. G. AULT.
BOILER FEEDER.
APPLICATION FILED JULY 7, 1902.
NO MODEL. 4 SHEETS—SHEET 1.
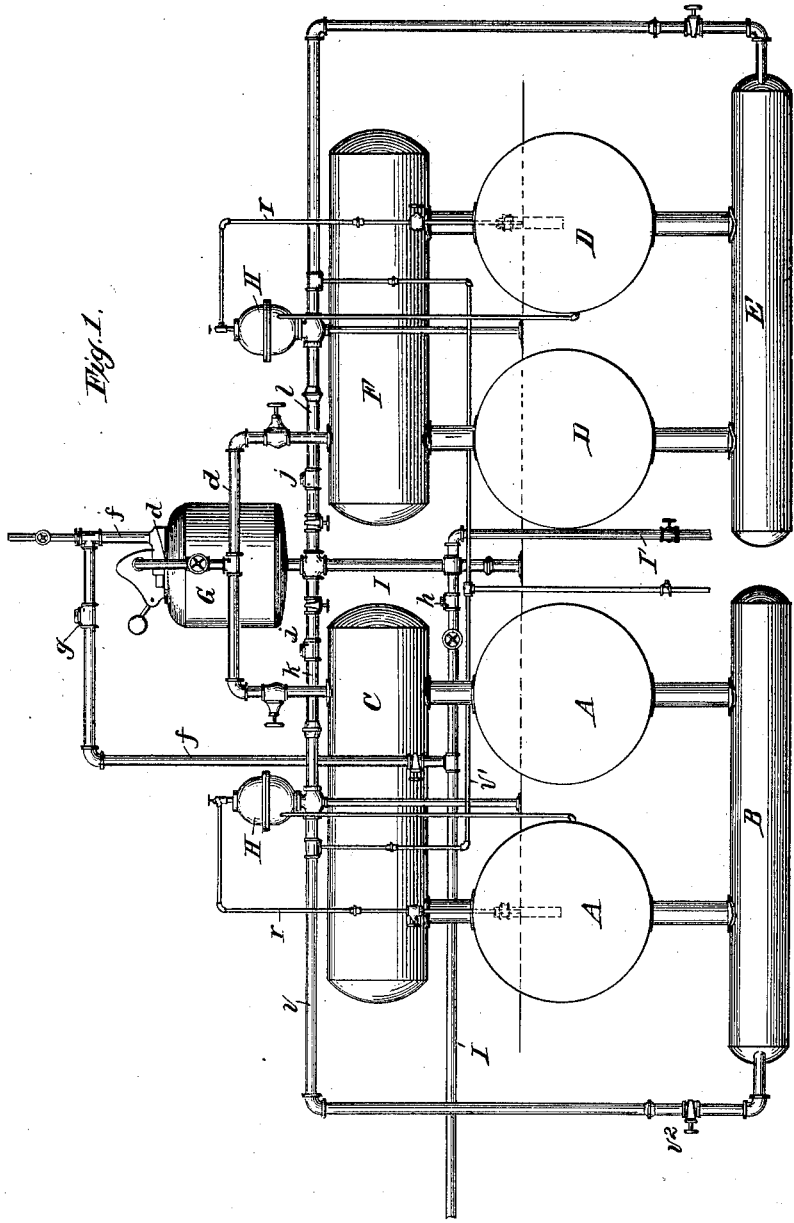
Witnesses
Inventors
Attorneys No. 736,702. PATENTED AUG. 18, 1903.
H. J. DAVIS & P. G. AULT.
BOILER FEEDER.
APPLICATION FILED JULY 7, 1902.
NO MODEL. 4 SHEETS—SHEET 2.
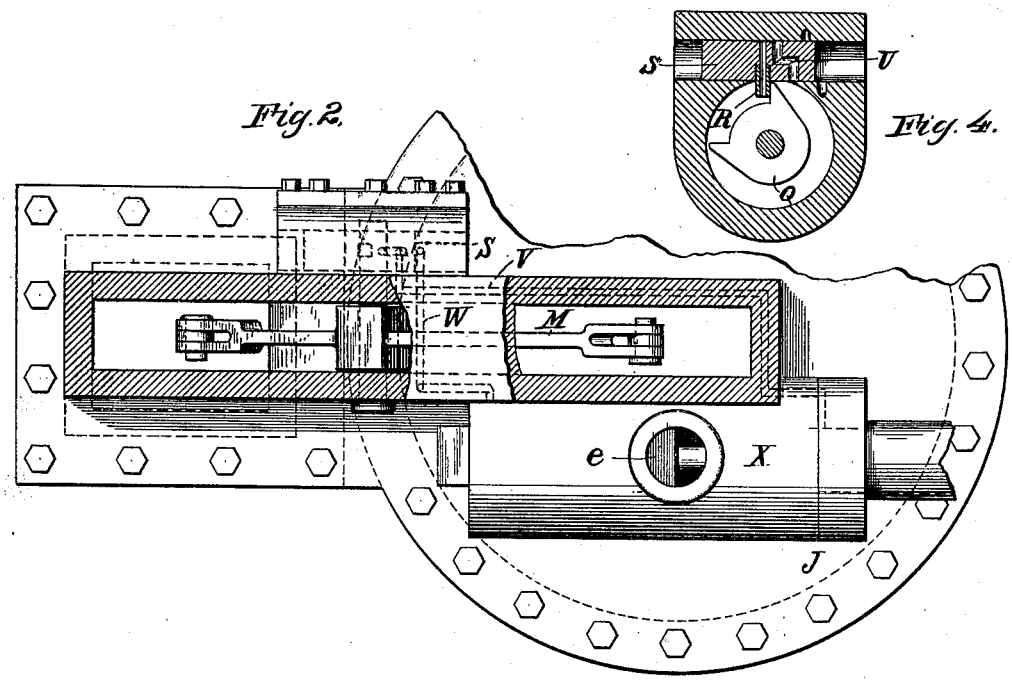
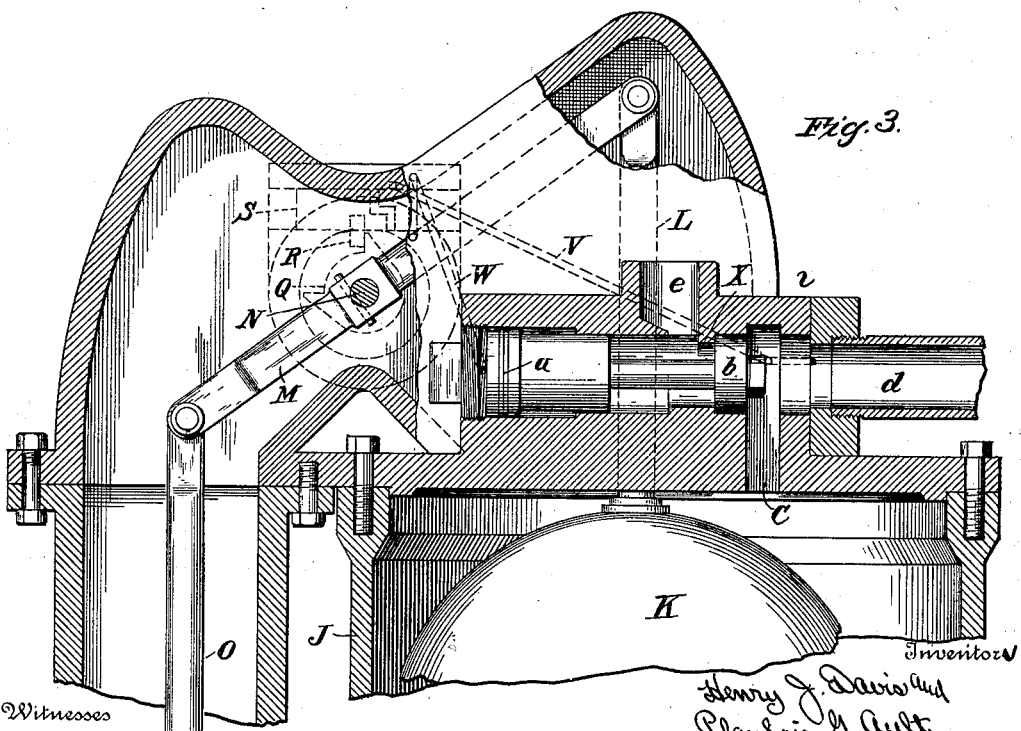

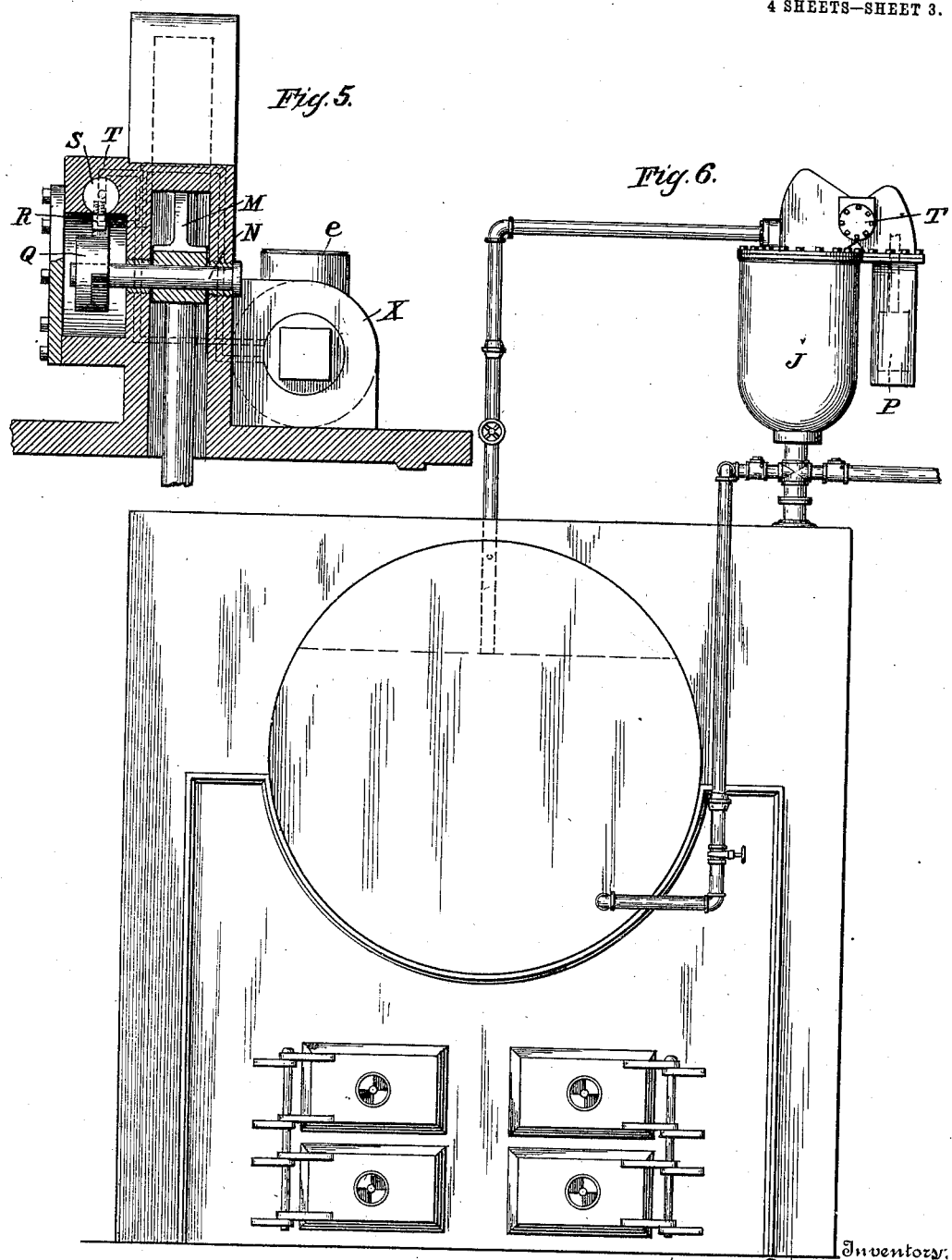

No. 736,702. PATENTED AUG. 18, 1903.
H. J. DAVIS & P. G. AULT.
BOILER FEEDER.
APPLICATION FILED JULY 7, 1902.
NO MODEL. 4 SHEETS—SHEET 4.
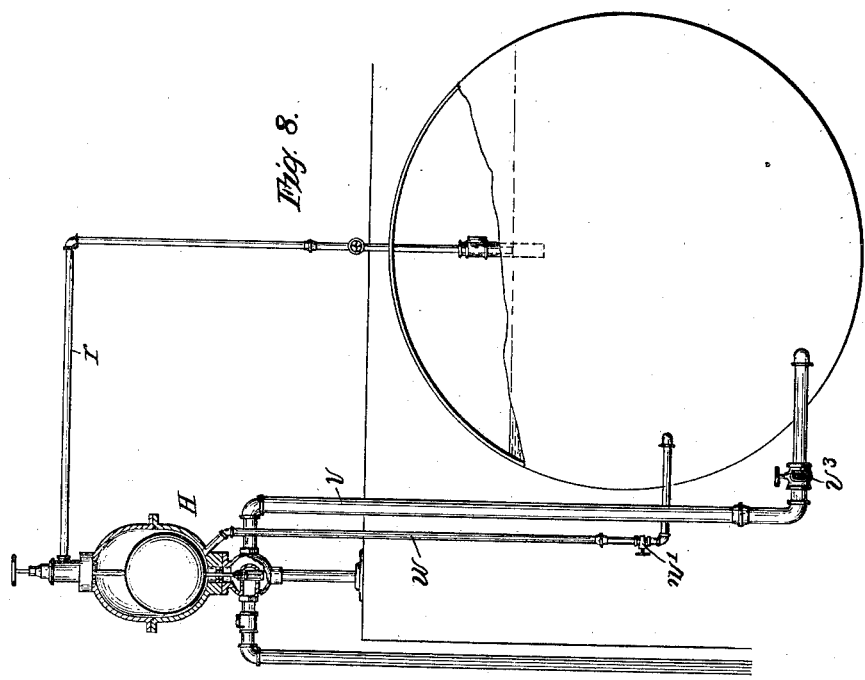
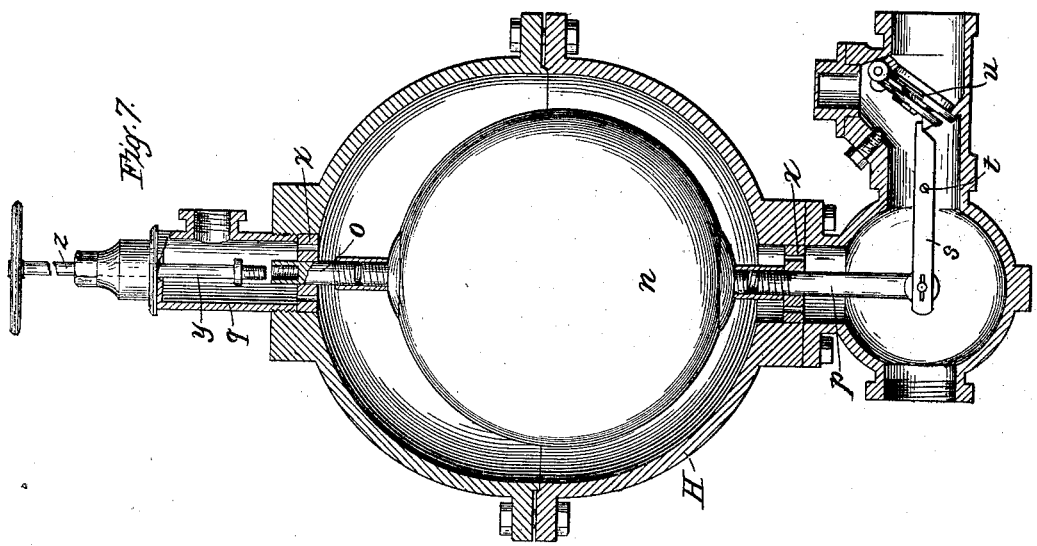

No. 736,702. Patented August 18, 1903.

UNITED STATES PATENT OFFICE.

HENRY J. DAVIS AND PLAYFAIR G. AULT, OF BIRMINGHAM, ALABAMA, ASSIGNORS TO DAVIS AUTOMATIC BOILER FEED COMPANY, OF BIRMINGHAM, ALABAMA, A CORPORATION OF ALABAMA.

BOILER-FEEDER.

SPECIFICATION forming part of Letters Patent No. 736,702, dated August 18, 1903.

Application filed July 7, 1902. Serial No. 114,576. (No model.)

*To all whom it may concern:*

Be it known that we, HENRY J. DAVIS and PLAYFAIR G. AULT, citizens of the United States, residing at Birmingham, in the county of Jefferson and State of Alabama, have invented certain new and useful Improvements in Boiler-Feeders, of which the following is a specification.

This invention pertains to improvements in water-feeders for steam-boilers, the construction and advantages of which will be hereinafter set forth, reference being had to the annexed drawings, wherein—

Figure 1 is a front elevation of a stack of boilers, showing our improved boiler feeding and regulating apparatus applied thereto; Fig. 2, a top plan view of the feeder proper, portions thereof being shown in section; Fig. 3, a vertical sectional view of the same parts on the line 1 1 of Fig. 2; Fig. 4, a similar view on the line 2 2 of Fig. 2; Fig. 5, a transverse vertical sectional view on the line 3 3 of Fig. 2; Fig. 6, a front elevation of a slightly-modified form of construction; Fig. 7, a vertical sectional view of the regulator, and Fig. 8 a similar view showing in detail its relation to a boiler.

The object of our invention is the production of a simple, positive, and efficient boiler-feeder in which the water passes by gravity from the feeder into the boiler, the operation and feed of the device being entirely automatic, said device coming into action as the level of the water in the boiler falls below a predetermined height.

A still further object of the invention resides in the provision of a general feeder working in conjunction with a series of supplemental regulators, one for each boiler in the battery.

The invention has other advantages than those incident to the construction above outlined, which will appear in the following description.

Referring to Fig. 1, A designates one boiler comprising two boiler-sections proper connected to a mud-drum B, common to both, and likewise connected to a common steam-drum C. D designates a second boiler similar in all respects to boiler A, having a mud-drum E and a steam drum or dome F. It will of course be seen that the two boiler-sections connected, as shown, to a common mud-drum and a common steam-drum form, in effect, a single boiler, the water-level being the same in each section.

A water-feeder G is arranged to feed water to the boilers (two or more) through regulators H, a regulator being employed in conjunction with each boiler of the series.

I designates the main feed-pipe, which is connected to the feed-water heater or other source of supply and leads to and is connected with the lower end of chamber or tank J of the feeder. Within the chamber is a hollow weight K, a stem L, extending upwardly therefrom, being connected to a cross-bar or lever M, pinned to a shaft N, which is journaled in the casing or housing that surmounts the chamber J. From the opposite end of the lever or bar M there is suspended a rod O, carrying a weight P, which is of such size as to counterbalance the weight-float or displacing-weight K when said displacing-weight is half submerged. Therefore if the power exerted by the displacing-weight be twenty-five and one-half pounds when the tank or chamber J is empty an equal power is exerted by the counterpoise when the displacing-weight is submerged.

In Fig. 1 the counterpoise is shown as arranged outside of the casing, in which construction the weight is carried directly by the cross-beam instead of being connected as above described, and shown in Figs. 2, 3, 5, and 6.

Shaft N has secured to it a tappet Q, which is arranged to work in conjunction with a pin or stud R, extending downwardly from a sliding valve S, mounted in a chamber or valve-casing T. Said valve is provided with a transversely-arranged port or opening U, adapted and designed to control passages or ports V and W, formed in the casing or frame, as shown in Figs. 3 to 5, inclusive. Passage V extends from a point in the forward part of a valve-chamber X, while the passage or port W is in communication with the opposite end of said chamber. Mounted within said chamber X is a piston-valve provided with two heads $a$ and $b$, the head $a$ being larger in surface area than the other for a purpose that will presently appear. Head $b$ throws a channel or way $c$ (which opens into chamber J) into communication with a steam-pipe $d$, which extends from the boiler or boilers, as indicated in Fig. 3, or when moved to the right closes said communication and likewise port V and throws said channel $c$ into communication with an exhaust-port $e$. The exhaust-port may be left open to the atmosphere or, as shown in Fig. 1, be connected by pipe $f$ to the supply-pipe I. In such case a suitable check-valve $g$ will be provided to prevent the water from passing into the exhaust-port. Main feed-pipe I is likewise provided with a check-valve $h$, which prevents retrograde flow of water in said pipe, and similar valves $i$ and $j$ are placed in the feed-pipes $k$ and $l$, which lead from pipe I or directly from chamber J to valve-chambers $m$ of the regulators H.

The regulators comprise each a casing in which is mounted a float $n$, provided with guide-stems $o\ p$, which extend through perforated diaphragms $x$, secured in the upper and lower ends of the casing.

Mounted upon the upper end of the regulator-casing is a shell or chamber $q$, which is in direct communication with the interior of the casing and also in communication with the steam-space of the boiler at times through a pipe $r$, said pipe extending down within the boiler to the water-level thereof.

The lower end of stem $p$ is connected to one end of an arm or lever $s$, fulcrumed at $t$. The outer or opposite end of said lever $s$ is designed to work in conjunction with a check-valve $u$, which controls the passage of water from the feeder proper through pipe $v$ to the mud-drum of the boiler. The check-valve $u$ is free to open at any time when the float $n$ is down. As will be seen, the end of the lever is not connected or fastened to the check-valve, but simply bears upon a projection formed on the valve when the float is in its elevated position, as indicated in Fig. 7. In other words, when the float is elevated the lever holds the valve closed; but when the float drops the valve may open to a greater or less extent and as a consequence serves to a certain degree to regulate the amount of water that passes to each boiler.

It is manifest that the pipe $v$ may pass to the mud-drum, as in Fig. 1, or directly to the lower portion of the boiler, where a mud-drum is not employed, as in Fig. 8.

When the water falls below a fixed point in the boiler, steam will pass through the pipe $r$ into the upper end of the regulator H, and any water which may be therein will as a consequence pass out and down into the boiler through a pipe $w$, Figs. 1 and 8, permitting the float $n$ to drop, thereby allowing the check-valve $u$ to open under pressure of the water which passes through the pipe $k$ from the feeder proper. The water will continue to flow through the pipes $k$ and $v$ into the mud-drum or boiler, as the case may be, until such time as the end of the pipe $r$ within the boiler is immersed in or sealed by the water within the boiler. The steam-supply will then be shut off, and water will therefore flow up through the opening formed in the diaphragm $x$, through which the stem $p$ passes, and elevate the float in the chamber. The elevation of the float acting through lever $s$ serves to force the valve $u$ to its seat, cutting off the supply of water to the boiler.

Inasmuch as the steam-supply is cut off from the pipe $r$, no steam will pass into the shell or chamber $q$, and the steam therein will soon condense, and as a consequence the water will be drawn up into the shell, as just stated.

So long as the pipe $r$ remains sealed the water will remain in the shell $q$ and keep the float elevated, holding the valve $u$ closed.

The upper end of the stem $o$ is internally threaded, as shown in Fig. 7, and is designed to be engaged by a correspondingly-threaded rod $y$, which slides through a packing box or gland $z$. The outer end of the rod $y$ is provided with a hand-wheel, by which it may be moved longitudinally and rotated axially to engage the threaded portion of the stem $o$.

When the parts are in engagement, the float $n$ may be depressed, elevating the lever $s$ and as a consequence freeing valve $u$. The purpose of this construction and the freeing of the valve is to permit the apparatus to be flushed, especially where foul water is employed.

As will be seen upon reference to Fig. 1, the pipe $v$ is connected with a blow-off $v'$, so that while the handle is moved up and down to cause the water to pulsate through the pipe and as a consequence stir up the accumulated sediment and mud the water and mud thus freed may pass out through said blow-off. At such times the valve $v^2$ in the pipe $v$ should be closed, as should also the valve $w'$ in the pipe $w$.

In Fig. 8 the pipe $v$ is shown as provided with a three-way valve $v^3$, which may be so adjusted as to cause a discharge of the muddy water and sediment, while at the same time the pipe is cut off from the water-space of the boiler. Either this construction or that shown in Fig. 1 may be employed, or any arrangement of piping may be used which will accomplish the same result.

The advantages of the employment of the pivoted check-valve $u$ over an ordinary slide-valve may be stated as follows: The swinging valve is not so liable to become clogged by the use of bad water. In practice the swinging valve is found more efficient in entirely stopping the flow of water should the plant be shut down for any reason. Furthermore, with the construction shown the power to be exerted by the float $n$ may be regulated as desired by shifting the fulcrum of the lever or connecting the float thereto at different positions from its fulcrum. Again, the pivoted valve is not so liable to stick as are the ordinary types of cylindrical valves.

A blow-off pipe I' is provided for the main supply-pipe I.

The operation of the apparatus is as follows: Assuming that the parts are in the positions shown in Fig. 3, with the displacing-weight or float K elevated and the water-chamber full and assuming, further, that there is a call for water in one or another of the boilers of the series, the water will pass from the chamber by gravity through pipe $k$ to the regulator H, and thence, as above described, to one of the boilers. The displacing-weight or float K will fall, and as a consequence will rock the lever M about its fulcrum, and the tappet Q will shift the valve S to the right, and consequently throw the port therein into communication with the ports or passages V W and permit the steam to pass through port W in rear of the piston-head $a$. The head $a$ being of a diameter larger than that of head $b$, the piston-valve will be moved over to the right, thereby cutting off the further supply of steam through the port V and allowing the channel $c$ to be thrown into communication with the exhaust-port $e$. Inasmuch as no steam can now pass into the chamber J, there will as a consequence be a vacuum formed in said chamber as soon as the steam condenses therein, and the water will be drawn up into said chamber, float K will again rise, shifting the valve, which will close the passage or port V and open the passage W, so that the steam in rear of the head $a$ may exhaust, while at the same time steam entering the pipe $d$ will act directly upon the head $b$, throwing the piston-valve to the left, or in the position shown in Fig. 3. In this position it will be seen that the steam may pass from pipe $d$ through the channel $c$ directly into the chamber J. This cycle of movements or action of the parts will take place every time the water is drained from the chamber J.

It is of course manifest that the piping or connections may be varied in details and that the apparatus may be otherwise changed without departing from the spirit of our invention. It will likewise be understood that the water feeds by gravity into the boiler or boilers.

Having thus described our invention, what we claim is—

1. In an apparatus of the character described, the combination of a series of independently-operable boilers; an elevated water-feeder; means for automatically filling said feeder; a discharge-pipe extending from said feeder to the boilers; regulators interposed in said pipe, one for each boiler in the series, each of said regulators serving to control the passage of water through the pipe to its boiler; and means controllable by the height of the water in each of the boilers for bringing its regulator into action, substantially as described.

2. In a water-feeder, the combination of a chamber; a displacing-weight mounted therein; a pivoted lever connected to said weight; a counterbalance connected to the opposite end of the lever; a valve; connections intermediate said valve and the lever for shifting the valve as the lever is rocked about its pivot or fulcrum; a steam pipe or inlet communicating with a passage extending into the chamber; an exhaust-port; and a piston-valve for controlling the steam inlet and the exhaust to throw one or the other into communication with the chamber and to likewise control the supply of steam to the valve, the piston being provided with heads of differential areas, substantially as and for the purpose described.

3. In an apparatus of the character described, the combination of a chamber, a displacing-weight mounted therein; a pivoted lever connected at one end to said weight; a counterbalance connected to the opposite end of the lever; a valve S; connections intermediate the lever and the valve for shifting the position of the valve as the lever is rocked or tipped about its pivot; a steam-supply pipe communicating with a passage extending to the chamber; a piston-valve provided with heads $a$, $b$, said head $a$ being of an area greater than that of the head $b$; an exhaust-port $e$; a port or passage V extending from a point adjacent to the steam-inlet to the valve S; and a second port or passage W communicating with the space in rear of the head $a$ and extending to the valve S and adapted to be connected to or thrown into communication with the port V by said valve, substantially as described.

4. In an apparatus of the character described, the combination of a feeder; means for automatically operating the same as water is withdrawn therefrom; a pipe extending from said feeder to the boiler; a valve located in said pipe; a shell or chamber in communication with said pipe; a float mounted in said shell or chamber; means operated by the float for controlling the position of the valve; and a pipe extending from the steam-space of the boiler and opening into the upper portion of the shell, said pipe being arranged to have its end sealed by the water in the boiler when said water rises to a predetermined height, substantially as described.

5. In an apparatus of the character described, the combination of a feeder; means for automatically operating the same as water is withdrawn therefrom; a pipe extending from said feeder to the boiler; a valve located in said pipe; a shell or chamber in communication with said pipe; a float mounted in said shell or chamber; a stem extending downwardly from the float; a pivoted lever connected to one end of said stem, the opposite end of the lever extending over into position for holding the valve closed when the float is elevated; and a steam-pipe extending from the upper end of the shell or chamber into the boiler, said pipe being so arranged as to have its end sealed when the water in the boiler rises to a predetermined height.

6. A regulator for water-feeders, comprising a shell or chamber in communication with the supply-pipe; a float mounted in said shell; a pivoted valve mounted in the supply-pipe; a stem extending downwardly from the float; a lever pivoted intermediate the stem and the valve; and connections between said lever and stem for moving the lever about its fulcrum, substantially as described.

7. A regulator for water-feeders, comprising a shell or chamber in communication with the supply-pipe; a valve pivoted in said pipe; a float mounted in said shell; a stem extending downwardly from said float; a lever $s$ pivoted in the supply-pipe; connections intermediate one end of the lever and the stem, the opposite end of the lever occupying a position over the valve when said valve is closed; a steam-pipe communicating with the upper end of the shell or chamber and with the steam-space of the boiler; and a pipe $w$ likewise extending from the shell and communicating with the water-space of the boiler.

8. A regulator for water-feeders, comprising a shell or chamber in communication with the supply-pipe; a valve pivoted in said pipe; a float mounted in the shell or chamber; connections intermediate the valve and float; a stem extending from the upper end of the float; and a threaded rod extending through the shell or chamber adapted and arranged to be connected to the stem, substantially as and for the purpose described.

9. In a regulator for water-feeders, the combination of a shell or chamber; a supply-pipe communicating therewith; a valve located in said pipe; a float mounted in the shell or chamber; connections intermediate the float and valve; a blow-off pipe extending from the supply-pipe; and means operable from without the shell or chamber for manually shifting the position of the float, substantially as and for the purpose described.

10. In an apparatus of the character described, the combination of a series of boilers; an elevated water-feeder; means for automatically filling said feeder; a discharge-pipe extending from said feeder to the boilers; float-regulators interposed in said pipe, one for each boiler in the series, each of said regulators serving to control the passage of water through the pipe to its boiler; and means controllable by the height of the water in each of the boilers for bringing its regulator into action, substantially as described.

In testimony whereof we have signed our names to this specification in the presence of two subscribing witnesses.

HENRY J. DAVIS.
PLAYFAIR G. AULT.

Witnesses:
GEO. H. BUNCH,
JAS. E. COOK.